3,169,845
METHOD OF AND APPARATUS FOR PRODUCING HIGH PURITY INERT GASES
Henry C. Kornemann and Edward F. Yendall, Kenmore, N.Y., assignors to Union Carbide Corporation, a corporation of New York
Filed May 23, 1958, Ser. No. 737,246
2 Claims. (Cl. 62—18)

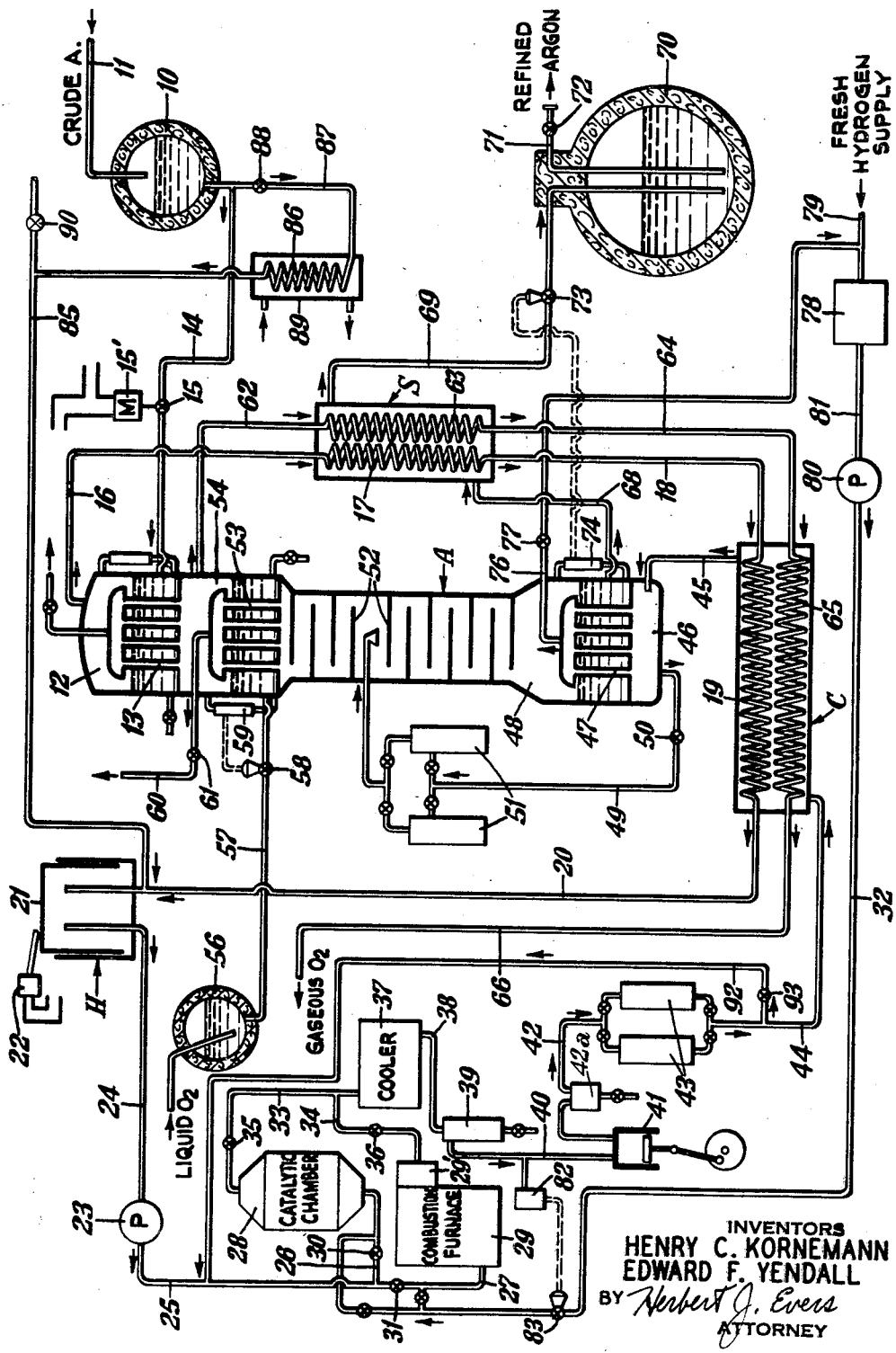

This invention relates to a high purity argon product having an impurity content less than 100 parts per million and to a method and apparatus for producing such high purity argon product, and more particularly, to a method and apparatus for refining argon containing nitrogen and oxygen impurities.

Crude argon obtained from air separation contains a residue of nitrogen and oxygen and these residual impurities have been difficult to remove by known rectification processes. Previously the refinement of crude argon included rectification processses to reduce the final nitrogen content to .02 to .08% and then chemical and combustion treatments to reduce the oxygen content. These processes involved high operation costs, were difficult to operate and control and did not provide the uniformly desired high purity. For example oxygen in argon is removable by combustion with hydrogen to form water vapor which can be condensed in part and the remainder removed by drying agents, but since there should be no appreciable residue of hydrogen, the control of such an operation is so difficult as to be commercially impractical.

Principal objects of the present invention are to provide a process and apparatus for the continuous commercial economical refinement of argon; to provide an argon product having a purity of the order of 99.999% or at least better than 99.99%; to provide such a process and apparatus that is easy to operate and control and which provides useful flexibility of storage; and to provide such a process and apparatus which employs hydrogen combustion of the oxygen content in a manner that insures substantially complete removal of the oxygen combined with a separation of excess hydrogen and residual nitrogen in a manner that provides the desired high purity product without requiring controls involving exceedingly difficult determinations of impurity concentrations of very small magnitude.

These and other objects and advantages of this invention will become apparent from the following description and accompanying drawing which diagrammatically illustrates a preferred assemblage of apparatus for carrying out the processes according to the invention as particularly applied to the refinement of crude argon.

According to the invention, the process includes the mixing of an excess of hydrogen with a crude rare inert gas, such as argon, containing oxygen and nitrogen impurities, and causing the oxygen content to combine with the hydrogen to form water which is suitably removed. The resulting mixture containing an excess of hydrogen is subjected to a fractional condensation operation and produces an enriched liquid argon fraction and separates substantially all the excess hydrogen in the form of a gaseous effluent. Such separated hydrogen containing some argon gas may be recirculated to the water removal operation together with fresh hydrogen required to make up the desired excess. The liquefied argon fraction is then employed as a reflux and subjected to low temperature rectification that produces a small effluent gas that carries off substantially all the nitrogen and residual hydrogen, and a high purity liquid argon product. The high purity liquid argon may be converted into the gaseous state for compression into high pressure cylinders or may be stored in a well insulated liquefied gas storage tank from which the liquid may be transferred to transportable containers.

Referring now to the drawing which illustrates a preferred system for processing crude argon in the liquid state and producing refined argon in the liquid state, a small supply of crude argon in the liquid state is held in a well insulated storage container 10 and this store is replenished from time to time through a supply conduit 11. Such crude argon may be a product of air separation by low temperature rectification, containing the usual oxygen and nitrogen impurities. The pressure in the container 10 may preferably be from 10 to 15 p.s.i.g.

The liquid crude argon must be gasified before it is treated to remove the oxygen and such gasification is preferably accomplished in a manner which recovers the refrigeration. To this end there is provided a rectifying column indicated generally at A, which will be hereinafter further described. The rectifying column A has an evaporating chamber 12 at its upper end which chamber has within it a condenser 13 that is used to condense a refrigerant such as liquid oxygen vapor as described hereinafter. The crude argon is fed to the chamber 12 by a conduit 14 controlled by a valve 15 that is preferably provided with a motor operator 15'. The vapor produced in chamber 12 is conducted by conduit 16 to a passage 17 in a heat exchanger S for subcooling the high purity liquid argon product of the invention and thence through conduit 18 to a passage 19 through a countercurrent heat exchanger C. By such heat exchanges the crude gaseous argon is warmed to about room temperature and passed by conduit 20 to a gas holder H. The gas holder may preferably be of the liquid sealed type and have a rising and falling gas bell 21 the movement of which operates a pressure switch 22 that is connected to transmit operating impulses to the motor operator 15' for adjusting the valve 15 to regulate the flow of liquid crude argon into chamber 12 according to the demand for gas sensed by the position of the bell 21 in the holder H.

The evaporation in chamber 12 occurs at a pressure of about 3 p.s.i.g. and the pressure in the gas holder H is only slightly above atmospheric. The gaseous crude argon is then pumped to a pressure of about 15 p.s.i.g. by a gas pump 23 having its suction connected to the holder by conduit 24 and its discharge conduit 25 connected to branch conduits 26 and 27, respectively, connected to the inlets of a catalytic reaction chamber 28 and a combustion furnace 29. The conduits 26 and 27 are controlled by valves 30 and 31, respectively.

When the amount of oxygen in the gas mixture is very low, for example, less than about 2%, the catalytic reaction chamber 28 is preferably used so that valve 30 will be open and valve 31 closed. On the other hand, if the crude gas contains considerable oxygen, about 2 to 15%, the combustion furnace is preferably used so that valve 30 will be shut and valve 31 open. The reaction chamber 28 may be of a customary type that contains a catalytic mass which effects a combination between hydrogen and oxygen. An example of a suitable catalytic device would be one known as the Baker & Co., Inc. "Deoxo" gas purifier. This, briefly, is an insulated vessel containing solid alumina pellets having pores filled with a noble metallic catalyst, such as palladium. Operating temperatures of about 1000° F. are reached and the outlet gas will contain less than 1 p.p.m. of residual oxygen. The combustion furnace 29 may also be of a customary construction to effect combustion between hydrogen and the oxygen content of the gas mixture. Such a furnace may briefly be described as an insulated chamber containing in its lower portion an alumina brick checkwork, the upper part being filled with refractory alumina spheres. Associated with the outlet of the furnace chamber is a catalytic clean-up chamber indicated at 29' which may contain active copper so that the outlet gas will contain less than 3 p.p.m. of residual oxygen. The hydrogen in a predetermined excess of from approximately ¼% to 4% and preferably between about ¼% and 2% above that required for stoichiometrically complete combination with the oxygen content of the crude argon is supplied through a conduit 32 which may connect to conduits 26 and 27. The hydrogen stream need not be pure hydrogen but it can contain some of the inert gas being purified, namely argon and some nitrogen and a trace of oxygen but it is preferably substantially completely free of other impurities such as hydrocarbons, carbon monoxide, and carbon dioxide.

From the reaction chamber 28 and the combustion furnace 29 conduits 33 and 34 controlled by stop valves 35 and 36 conduct the combusted gas mixture to a cooler 37. This cooler may be a heat exchanger cooled by water. From the cooler a conduit 38 conducts the combusted mixture to a trap 39 for removal of condensed water vapor after which the hydrogen content of the mixture is adjusted to between about ¼% and 2% as later explained. Thereafter the mixture is conducted by conduit 40 to the inlet of a gas compressor 41 which compresses the mixture that now contains preferably approximately 2% of hydrogen, the original nitrogen content, and any nitrogen that might have been introduced with the hydrogen, and less than 3 p.p.m. of oxygen, to a pressure of 50 to 125 p.s.i.g. A condensate trap 42a is located in the discharge of the compressor 41 to remove water carryover.

The gas is then preferably dried by contact with a moisture removing agent such as silica gel or alumina gel held in chambers 43 which are connected to the discharge of 42 of the compressor after the water trap and which are provided in duplicate and have means not shown for reactivating one chamber while the other is in use. Thorough drying before cooling the gas to low temperature is important to avoid deposition of frost in the heat exchanger passages at a rate requiring that they be defrosted after undesirably short operating periods. From chambers 43, conduit 44 conducts the dried gas mixture to the warm end of the countercurrent heat exchanger C and from the cold end of this heat exchanger a conduit 45 conducts the mixture, now cooled to between −200° F. and about −257° F., to the bottom chamber 46 of a condenser 47 that is disposed within a reboiler chamber 48 at the base of the column A.

The condenser 47 liquefies a major portion of the gas mixture including only a very small part of its hydrogen content and this liquid fraction, constituting an argon-rich reflux liquid, which collects in chamber 46 is conducted by transfer line 49 to an intermediate point of the rectifying column A. The transfer line is controlled by an expansion valve 50 and has interposed therein one or the other of a pair of filter devices 51 which remove any traces of solidified impurities from the liquid. The filter devices 51 may be simple ceramic or porous metal filters or they may also include a body of adsorbent to remove traces of dissolved as well as solidified impurities that have boiling points higher than the components of the gas mixture. The expansion valve reduces the pressure to the column pressure of 15 to 60 p.s.i.g. In the rectifying column there are gas and liquid contact trays 52 which effect interchange between the descending liquid and vapors rising from the reboiler chamber 48.

For operation of the column, a means for providing reflux at the upper end thereof is required. Such reflux is conveniently produced by a condenser 53 mounted on top of the rectifying portion of the column to receive and condense vapors therefrom. The condenser 53 is preferably refrigerated by a suitable refrigerant such as boiling liquid oxygen in a chamber 54 surrounding the condenser 53. The liquid oxygen is preferably supplied from an external source such as an air separation plant and a store of liquid oxygen is held temporarily in a well insulated container 56 at a pressure of about 10 to 20 p.s.i.g. From the container 56 a conduit 57 transfers liquid oxygen as required to the chamber 54, the conduit 57 being preferably controlled by a valve 58 operated automatically in response to the liquid level in the chamber 54 as measured by a liquid level device 59.

The effluent gaseous remainder of the rectification, which contains substantially all the nitrogen of the original gas mixture and the residual hydrogen in the argon-rich reflux liquid, collects in the upper header of the condenser 53 from which it is vented through conduit 60 controlled by the vent valve 61. This vent gas may contain as much as 50% argon but since the actual amount is small the loss of argon is negligible.

Part of the evaporated oxygen in the chamber 54 is recondensed and returned to the chamber by the condenser 13 which is mounted on the top of the chamber 54. The amount of oxygen recondensed corresponds to the amount of liquid crude argon which is evaporated in the chamber 12. That part of the vaporized oxygen which is not recondensed is conducted by a conduit 62 to another passage 63 through the heat exchanger S then through conduit 64 to the cold end of a heat exchange passage 65 in the countercurrent heat exchanger C thus recovering refrigeration from the vapors. From the warm end of the passage 65 a conduit 66 may conduct the gaseous oxygen to a place of use, storage, or a reliquefaction system which is not shown. The extra make up liquid oxygen refrigerant supplied through conduit 57 corresponds approximately to the refrigeration requirement needed to operate the rectifying column, to offset heat leaks and heat exchange inefficiencies and for subcooling the high purity liquid argon product of the invention.

The purified liquid argon product collects in the chamber 48 and is withdrawn therefrom by a conduit 68 to the warmer end of the heat exchanger S which acts as a subcooler for the liquid argon product so that when the liquid is transferred to a storage container at a lower pressure, substantial flashoff of liquid into vapor state is avoided. The liquid argon product is then conducted by conduit 69 to an argon storage container 70 which is preferably insulated with high efficiency type of insulation such as the powder-in-vacuum type. A conduit 71 controlled by valve 72 may be used to draw off quantities of the liquid refined argon to transport containers or suitably insulated liquid argon cylinders, such as described in U.S. application Serial No. 599,733, filed July 24, 1956, by P. E. Loveday and L. A. Bliss, now Patent No. 2,951,348, from time to time as required. In this manner, the high purity liquid argon may be delivered in the liquid state to the consumer, thus maintaining the quality of purity of liquid argon product to the point of use. A preferred pressure for storage would be about 3 p.s.i.g. The withdrawal of the refined argon from the chamber 48 may be automatically controlled by a valve 73 in line 69 which is adjusted in response to the measurement of the liquid level in chamber 48 by a liquid level device 74.

The major portion of the excess hydrogen in the mixture delivered through conduit 45 collects in the upper header of the condenser 47 from which it is withdrawn together with some argon by a conduit 76 that is controlled by a valve 77. The conduit 76 preferably conducts such vented hydrogen to a hydrogen gas holder 78 which is kept filled by adding thereto substantially pure hydrogen as required from a supply thereof through a conduit 79. Hydrogen for the reaction in chambers 28 and 29 is drawn by a gas pump 80 having its suction 81 connected to the gas-holder 78 and its discharge connected to the conduit 32. The gas pump 80 provides a discharge pressure of approximately the same or slightly higher than the discharge pressure of the crude argon gas pump 23.

The amount of hydrogen mixed with the crude gaseous argon is preferably predetermined by automatic means such as a gas analyzer 82 that is connected to take a sample of the gas through the conduit 40, analyze it and provide a control impulse that operates an automatic valve 83 interposed in the conduit 32. The control system is constructed to respond relatively quickly to changes in the percentage of excess hydrogen. Since the amount of this excess hydrogen is substantial, it is relatively easy to obtain an effective control by an analyzer of the type that compares the thermal conductivity of the mixture with that of pure argon.

In the event that the rate of evaporaion in the chamber 12 does not supply crude gaseous argon to the holder H at a sufficient rate, additional gaseous argon may be supplied to the holder through a conduit 85 from the warm end of an evaporator coil 86, the cold end of which may be supplied with liquid crude argon through conduit 87 connecting it with the bottom of container 10. A valve 88 is in the conduit 87 to control the flow. The evaporator coil 86 is heated by a heating medium in jacket 89.

When crude argon containing slightly more than 2% oxygen is to be processed it may be desirable to use the catalytic chamber 28 rather than the furnace 29. This may be accomplished by reducing the oxygen content of the gas fed to chamber 28 to a desired 2% by recirculating some combusted gas from conduit 44 back to conduit 25 through a by-pass connection 92 with a valve 93 therein for adjusting the flow when required.

The amount of hydrogen used is only that which is reacted with the oxygen content of the crude gas plus the very small remainder which is vented with the effluent gas through conduit 60. While such effluent could be treated to remove nitrogen and recycled or passed through the countercurrent heat exchanger C to recover refrigeration, the amount of effluent is too small to warrant the expense of such treatment. If desired the gas passing through conduit 76 could also be passed through a passage in the countercurrent heat exchanger C to recover its refrigeration before it is passed to the holder 78. The hydrogen content of the vent gas in conduit 76 can vary from 20% to 80% according to the pressure relations of operation; preferably the hydrogen content will be between 50 and 60%.

The process of the invention also provides novel argon products of exceptional purity comprising gaseous and liquid argon products in commercial bulk quantities and having a purity of the order of 99.99% or better. The impurity content of the argon product comprises hydrogen, oxygen, moisture and nitrogen, there being preferably not over 1 p.p.m. of hydrogen, not over 3 p.p.m. of oxygen, not over 3 p.p.m. water, and a nitrogen content less than about 5 p.p.m. The gaseous product when compressed and delivered in cylinders may pick up traces of material other than argon but analyses of cylinder argon originally of a purity stated above indicated less than 10 p.p.m. of hydrogen, less than 7 p.p.m. of oxygen, less than 15 p.p.m. water and up to 50 p.p.m. of nitrogen.

The argon product of the invention, containing between 3 and 50 p.p.m. of nitrogen, is admirably suited for use as a shielding gas in consumable and non-consumable electrode electric arc welding, particularly in the welding of such difficult to weld metals as titanium and aluminum. The resulting weld characteristics differ dramatically from the prior art in that welding action is considerably smoother and the speed of welding is at least 50% faster.

A typical commercial high purity liquid argon product produced in accordance with the invention should preferably have a purity of 99.995% and the following impurity range:

|  | P.p.m. |
|---|---|
| Oxygen | 2–10 |
| Hydrogen | ½–10 |
| Water vapor | 2–15 |
| Nitrogen | 2–10 |
| Products of hydrocarbon combustion | 1–5 |

The system described above in detail treats a liquid crude argon supply and produces high purity liquid argon. It may be briefly referred to as a liquid crude to liquid product system. Since the crude argon can also be in the gaseous state and since a gaseous product may sometimes be desired, useful modifications of the system may be classed as; gaseous crude to liquid product; gaseous crude to gaseous product; liquid crude to gaseous product; and liquid crude to liquid and gaseous product.

In a modification for gaseous crude to liquid product, such crude argon may be fed directly into the gas holder H through a valved connection 90 to conduit 85, and the system modified as described below. The pump 23, catalytic chamber 28 or combustion furnace 29, cooler 37, trap 39, compressor 41, dryers 43, countercurrent heat exchanger C, condenser 47, impurity removing devices 51, and the column A will be operated substantially as previously described. The condenser 13 will be inoperative or could be omitted. Also the heat exchange passages 17 and 19 and connecting conduits 16, 18 and 20 are inoperative or omitted. All the refrigeration to make reflux for the operation of the column and liquefy the argon, is now supplied by the liquid oxygen refrigerant and the supply thereof through conduit 57 is accordingly increased. The increased flow of oxygen vapor in conduits 62, 64, 66 then provides the heat absorbing power in passages 63 and 65 for the desired subcooling of the liquid argon product in subcooler S and the cooling of the combusted oxygen-free gas mixture in heat exchanger C.

For a gaseous crude to gaseous product modification; the crude is supplied at 90 and processed through the oxygen removal stages, compression, moisture removal, liquefaction and hydrogen separation, cleanup and then supplied as feed into column A which must be modified accordingly. The subcooler S is omitted and because there is not enough heat in the compressed gas fed through conduit 45 to evaporate all the pure product argon in addition to the vaporization requirement for the rectification, the product argon is withdrawn from chamber 48 in liquid state and preferably, after reduction of pressure, heat exchanged with vapors of the oxygen refrigerant of chamber 54 by passing it around the tubes of a condenser similar to condenser 13, then the now gaseous pure product argon can be warmed by passage through a passage of countercurrent heat exchanger C and thence to receiving means such as an argon cylinder charging compressor.

For a liquid crude to gaseous product modification, the system changes in respect to the pure gas product production are simlar to that just previously described. However, since the liquid crude supplies an adequate amount of refrigeration the oxygen refrigerant can be eliminated and instead the liquid crude argon is vaporized by passage around a reflux condenser similar to condenser 53.

A very flexible alternative system modification is the one starting with liquid crude and delivering gaseous and liquid pure product in varying proportions as desired. Such modification may be similar to that described in connection with the drawing but with additions including an auxiliary condenser connected to receive and condense oxygen vapor from 54 (similar to condenser 13) with the tubes of such auxiliary condenser surrounded by a chamber containing liquid pure product argon after pressure reduction and drawn from chamber 48 through a branch connection of conduit 68. The desired liquid pure product would be obtained as originally described through line 68 subcooler S, and conduit 69 while the desired gaseous pure product is withdrawn from the boiling chamber around the auxiliary oxygen condenser. Such system is flexible because as more pure product is withdrawn in liquid state and less in the gaseous state, more make up refrigerant oxygen will be used to compensate for the refrigeration contained in the liquid portion of the pure product.

A further alternative may start with a gaseous crude argon supply with delivery of gaseous and liquid pure product as desired. The gaseous crude supplied at connection 90 is processed through the oxygen removal, compression moisture removal, liquefaction and hydrogen separation and cleanup steps and then fed to the rectifying column. The portion of the refined product argon to be produced as gas is withdrawn in liquid state from chamber 48, for example by a branch of conduit 63 and vaporized after reduction of pressure by heat exchange with oxygen refrigerant vapors from chamber 54 in a condenser similar to the condenser 13. Such gaseous product can be warmed if desired by passage through a separate passage of the heat exchanger C. When the proportion of liquid product is increased, the consumption of liquid oxygen refrigerant will be correspondingly increased.

From the above description, it will be seen that the present invention provides a novel sequence of steps in the refining of crude argon comprising substantially simultaneously removing oxygen and adding hydrogen to crude argon gas, removing hydrogen while fractionally condensing the argon gas to produce an argon-rich reflux liquid, and finally removing from the argon-rich liquid the hydrogen traces plus substantially all the nitrogen content. The novel argon product of the invention has a purity on the order of 99.999% or at least 99.99% with limited amounts of hydrogen, oxygen, nitrogen and moisture. An important aspect of the invention is that it provides an improved method of producing and delivering argon of at least 99.99% purity to a consumer by forming a high purity argon in the liquid state, transporting the liquid high purity argon to the consumer, converting the liquid high purity argon and delivering it to the consumer as a high purity gas of at least 99.99% purity.

It will be understood that modifications and variations may be effected without departing from the spirit and scope of the invention.

This application is a continuation-in-part of our copending application Serial No. 375,211, filed August 19, 1953, now abandoned.

What is claimed is:

1. A process for refining liquid crude argon containing oxygen and nitrogen comprising the steps of vaporizing the crude argon, adding to the resulting crude gas mixture a supply of hydrogen at a rate in excess of stoichiometric requirements for reaction with the entire oxygen content, effecting reaction between the oxygen content of the crude mixture and said hydrogen, compressing the resulting gas mixture containing the unreacted hydrogen, drying the compressed mixture to a very low water content, cooling the dried mixture to a low temperature, subjecting the cooled mixture to fractional liquefaction to produce a gaseous remainder containing a major portion of the excess unreacted hydrogen and a liquid fraction containing the original nitrogen content in said crude argon and some residual hydrogen, employing the liquid fraction as a reflux liquid in a rectifying operation between said liquid fraction and said gaseous remainder to produce a refined liquid argon product of at least 99.99% purity substantially free of oxygen, hydrogen and nitrogen and an effluent gas containing substantially all of the residual hydrogen and a substantial amount of the original nitrogen content.

2. A three-condenser system for the production of a high purity liquid argon product from a liquid crude argon comprising an elongated rectification column having disposed at the base thereof a lower condenser in heat exchange relation with a reboiler chamber, a crude argon evaporating chamber in heat exchange relation with a refrigerant condenser, a liquid refrigerant chamber in heat exchange relation with a reflux condenser in communication with the upper end of said column, said lower condenser having a gas inlet for the introduction of hydrogen-containing argon gas, a gas outlet for the removal of gaseous hydrogen, and a liquid outlet for the removal of liquid argon containing traces of hydrogen, a conduit for transferring the liquid argon in said liquid outlet to an intermediate point in said column as a feed liquid therefor for subsequent rectification and deposition as a refined liquid argon product in said reboiler chamber, a gas effluent outlet in said reflux condenser for removing hydrogen and nitrogen containing effluent of rectification from said column, means for controllably supplying liquid refrigerant and liquid crude argon to said refrigerant chamber and said evaporating chamber respectively, said refrigerant chamber being in communication with said refrigerant condenser, and means for removing crude argon gas from said evaporating chamber and substantially eliminating the oxygen content thereof in preparation for its introduction into said lower condenser through said gas inlet.

References Cited in the file of this patent

UNITED STATES PATENTS

| | | |
|---|---|---|
| 1,360,853 | Wucherer | Nov. 30, 1920 |
| 1,512,268 | Barbet | Oct. 21, 1924 |
| 1,527,639 | Fonda | Feb. 24, 1925 |
| 1,615,597 | Seligmann | Jan. 25, 1927 |
| 1,658,631 | Bannenbaum | Feb. 7, 1928 |
| 1,723,425 | Jaubert | Aug. 6, 1929 |
| 1,892,186 | Curtis | Dec. 27, 1932 |
| 2,480,094 | Anderson | Aug. 23, 1949 |
| 2,497,589 | Dennis | Feb. 14, 1950 |
| 2,530,602 | Dennis | Nov. 21, 1950 |
| 2,582,885 | Rosenblatt | Jan. 15, 1952 |
| 2,591,658 | Haringhuizen | Apr. 1, 1952 |
| 2,617,272 | Aidier | Nov. 11, 1952 |
| 2,632,316 | Eastman | Mar. 24, 1953 |
| 2,696,088 | Twomey | Dec. 7, 1954 |
| 2,699,046 | Etienne | Jan. 11, 1955 |
| 2,874,030 | Dennis | Feb. 17, 1959 |
| 2,990,689 | Lorenz | July 4, 1961 |

FOREIGN PATENTS

| | | |
|---|---|---|
| 351,898 | Great Britain | July 2, 1931 |
| 664,120 | Great Brtain | Jan. 2, 1952 |
| 473,985 | France | Feb. 3, 1915 |

OTHER REFERENCES

Mellor: "Comprehensive Treatise on Inorganic and Theoretical Chemistry," Longmans, Green & Co., New York, vol. 7, page 903.

Davies, M.: The Physical Principles of Gas Liquefaction and Low Temperature Rectification, New York, Longmans, Green & Co., 1949, pages 188–194.